March 9, 1948.   G. L. TAWNEY   2,437,281
HIGH FREQUENCY RADIANT ENERGY APPARATUS
Filed July 19, 1944   5 Sheets-Sheet 1

INVENTOR
GERELD L. TAWNEY
BY
ATTORNEY

March 9, 1948.   G. L. TAWNEY   2,437,281
HIGH FREQUENCY RADIANT ENERGY APPARATUS
Filed July 19, 1944   5 Sheets-Sheet 2

INVENTOR
GERELD L. TAWNEY
BY Paul B. Hunter
ATTORNEY

Patented Mar. 9, 1948

2,437,281

UNITED STATES PATENT OFFICE 2,437,281

HIGH-FREQUENCY RADIANT ENERGY APPARATUS

Gereld Leon Tawney, Hempstead, N. Y., assignor to The Sperry Corporation, a corporation of Delaware Application July 19, 1944, Serial No. 545,580

22 Claims. (Cl. 250—11)

The present invention is concerned with the art including antennas for the radiation or reception of radiant energy, such as electromagnetic waves, and is more particularly concerned with highly directional antenna apparatus having a periodically varying direction of maximum directivity.

In many useful applications of electromagnetic energy, and especially in the ultra high frequency field, it is desirable to continuously and periodically sweep or scan the directivity characteristic of a highly directive antenna system according to a predetermined law or rule of variation. Such apparatus may be used for sweeping a radiated beam of radiant electromagnetic energy according to a predetermined pattern, or for successively and continuously receiving radiant energy in selective fashion from periodically varying portions of space. Such apparatus has come to be known as a "scanner."

In the prior art it has been known to form such scanning apparatus by physically and mechanically moving a directive antenna system so as to cause its directivity characteristic to vary in accordance with the desired pattern. Such systems, while effective for many purposes, are complicated by the necessity for providing mechanical moving parts and motive means for such moving parts. Also, such systems are limited in rates or periodicity of scanning, since the antenna is positioned by mechanical means which permit only relatively low scanning rates or frequencies. It is, therefore, highly desirable to provide scanning systems in which moving parts are completely eliminated and which are adapted for scanning rates or frequencies higher than those attainable with mechanical scanners. Such inertialess stationary scanners have been termed "electronic scanners" and it is an object of the present invention to provide improved and novel electronic scanners for these purposes.

According to the present invention, electronic scanning may be performed by providing a plurality of different antennas having directivity characteristics covering different portions of space, and which are preferably overlapping in space, these antennas being successively energized by, or rendered receptive to, electromagnetic energy, to provide scanning action.

According to one aspect of the present invention, the energy to be radiated is supplied successively and only partially concurrently to successive antennas, having different overlapping directivity characteristics. Similarly, for a receiving scanner, energy is taken successively and only partially concurrently from successive antennas having overlapping directivity characteristics. As a refinement on this system, the wave form of the energy radiated to or taken from the antennas is selected to provide a substantially smooth and continuous transfer of energy to or receptivity from, the successive antennas.

According to another aspect of the invention, in a radiating scanner, these wave forms are produced by the synthesis of suitably related constant single frequency waves, whose amplitudes and phase relations are adjusted or selected in accordance with the invention to provide the respective plurality of different waves to be radiated by the respective antennas.

According to another aspect of the invention, the electronic scanning for radiation is effected by separately radiating single constant frequency waves of suitably related frequency, each such wave being radiated to essentially the same portion of space, but with an individual respective directivity characteristic, the phases and directivity characteristics of these several single frequency waves being adjusted or selected in accordance with the principles of the present invention to provide electronic scanning as desired.

Accordingly, it is an object of the present invention to provide improved methods and apparatus for effecting electronic scanning.

It is another object of the present invention to provide improved methods for varying the directivity characteristic of an electromagnetic directional antenna to scan a desired field of view without the use of moving parts, and at high rates substantially without inertia.

It is a further object of the present invention to provide improved methods and apparatus for producing electronic scanning by use of an electromagnetic antenna of varying directivity characteristic, said antenna radiating several waves of the same wave form with different directivity characteristics and into different portions of space.

It is still another object of the present invention to provide improved methods and apparatus for producing electronic scanning by radiating a plurality of single frequency waves to the same portion of space with respectively individual directivity characteristics.

Other objects and advantages will become apparent from the specification, taken in connection with the accompanying drawings wherein.

Figure 1:
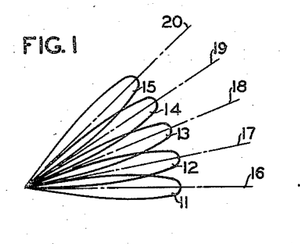
Fig. 1 is a diagram illustrating a plurality of highly directive lobes of electromagnetic radiation having overlapping directive characteristic patterns but with respectively different axes of maximum directivity.

Fig. 1 shows a number of highly directive radiation or directivity patterns 11, 12, 13, 14 and 15, whose respective axes of maximum directivity 16, 17, 18, 19 and 20 are disposed at slight angles to one another as shown. These patterns may be produced by independent directive antennas or in the manner discussed more in detail below.

Figure 2:
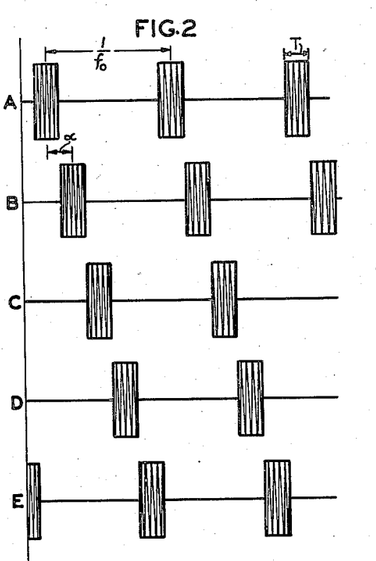
Fig. 2 shows a series of time graphs of modulated electromagnetic waves to be radiated or received in accordance with the characteristics of Fig. 1 to produce the advantages of the present invention.

One type of scanning of the radiation from such an antenna system can be obtained by successively and intermittently supplying the high frequency energy to be radiated to the respective antennas producing these radiation patterns 11 to 15. This is illustrated in Fig. 2 wherein are shown the wave forms or time graphs of the waves radiated in accordance with the respective patterns, under these conditions. Thus, in Fig. 2, curve A represents the wave form of the wave transmitted in accordance with pattern 11. Curves B, C, D, and E similarly show the wave forms of the waves radiated according to patterns 12 to 15, respectively. These waves have a carrier frequency $f$ and each will be seen to have an envelope which is a periodic pulse wave having a pulse repetition frequency $f_0$ and a pulse duration T. The successive envelopes of the waves of Fig. 2 are time-shifted with respect to one another by an amount $\alpha$ between successive envelopes, $\alpha$ being equal to $$\frac{1}{nf_0}$$

(which is also preferably the value of T) where $n$ is the number of separate waves radiated, corresponding to the number of radiation patterns utilized, and illustrated here as five in number. Any desired number may be used, depending on the desired range and relative smoothness of the scanning.

In this manner, by radiating high frequency energy in accordance with the respective radiation patterns 11 to 15, the energy radiated being as shown in Fig. 2, the resultant radiated energy will step discontinuously and progressively from direction 16 toward direction 20 and then will repeat this operation successively. This is a type of scanning which may be useful under some circumstances, but is generally too crude because of its discontinuous character.

Figure 3:
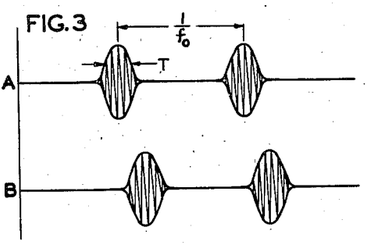
Fig. 3 shows a set of time graphs similar to, but modified with respect to Fig. 2.

This type of scanning has the further disadvantage that a very large number of side band frequencies will be required. Thus, as is well known, a square pulse such as the envelope in Fig. 2A can be represented by a Fourier series of the following type:

$$V_e = f_0 T + \sum_{m=1}^{m=\infty} \frac{2 \sin (\pi m f_0 T)}{\pi m} \cos (2\pi m f_0 t) \quad (1)$$

and will be seen to have an infinite number of components of different frequencies spaced by the amount $f_0$ and having a gradually decreasing amplitude, the maximum amplitude of any component being inversely proportional to the order $m$ of that component. When such a wave is modulated upon a high frequency carrier, it produces a correspondingly infinite number of side band frequencies both above and below the carrier frequency. As a practical matter, side band components having an amplitude factor of less than 5% of the amplitude of either the carrier component or the first side band component may be ignored. However, even with this practical limitation on the number of side bands, an excessively broad band width is required by this system. To avoid these disadvantages, the pulse wave envelope of Fig. 2 may be replaced by the envelope shown in Fig. 3, which represents a discontinuous squared-cosine pulse wave; that is, the wave shape of any one pulse is one complete cycle of the square of a cosine wave of quarter-period T, these pulses recurring at a repetition frequency $f_0$. It is to be understood that the envelope of Fig. 3A may be used for the wave radiated by pattern 11, similar squared-cosine pulse waves such as that in Fig. 3B, time-displaced by the amount $\alpha$ defined above being utilized for the waves radiated according to the remaining radiation patterns 12 to 15.

By the use of such a squared-cosine pulse wave instead of the square pulse wave, the number of side band components is greatly reduced because the higher order Fourier components of such a squared-cosine pulse wave decrease in amplitude as the cube of the component order instead of being inversely proportional to the first power of the component order as in the envelope of the wave of Fig. 2. This will be seen from the following expression for these Fourier components.

$$V_c = f_0 T + \sum_{m=1}^{m=\infty} \frac{\sin (2\pi m f_0 T)}{\pi m [1 - (2m f_0 T)^2]} \cos (2\pi m f_0 t) \quad (2)$$

This pulse wave of Fig. 3 has a further advantage in that the scanning is performed less discontinuously. As shown in Fig. 1, the radiation patterns 11 to 15 are preferably overlapping, for example, at their half-power points. The energy radiated according to successive radiation patterns, using the wave forms of Fig. 3, also overlaps in time, as shown by the curves of Figs. 3A and 3B, so that the axis of maximum directivity of the resultant radiated energy, instead of stepping discontinuously from 16 to 17, etc., as with the waves of Fig. 2, will now shift more continuously from 16 to 17, etc., as the energy radiated according to pattern 11 decreases and that according to pattern 12 increases, in accordance with the envelopes of the waves in Figs. 3A and 3B.

In Figs. 1–3 it has been assumed, for illustrative purposes only, that five waves are radiated to produce the scanning. Of course, any number of such waves may be used, depending on the range and relative smoothness of scanning desired.

Figure 4:
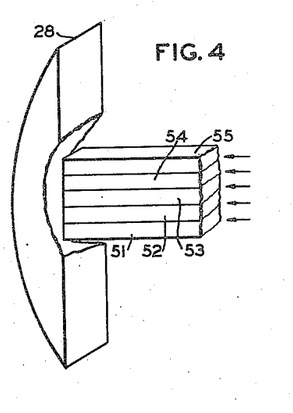
Fig. 4 shows a perspective view partially cut away of a reflector and wave guide feeds therefor for producing the characteristics of Fig. 1.

One convenient and simple way of radiating these plurality of waves is illustrated in Fig. 4. As shown here, a plurality of high frequency wave guides 51 to 55 are provided, each energized by a respective one of the five waves illustrated in Fig. 2 or Fig. 3. These five wave guides are placed in line in front of a preferably parabolic reflector 28 which, for example, may be formed as a parabolic cylinder having relatively short axial length, but with an opening across its mouth which is preferably many times the free space wave length of the radiated wave. By making the central wave guide 53 extend along the focal line or axis of the parabolic reflector, its directivity axis (corresponding to 18 of Fig. 1) will extend along this focal axis. The other wave guides will then radiate energy in cooperation with the reflector 28 in directions slightly angularly disposed with respect to this focal line, and will produce the plurality of radiation patterns 16—20 shown in Fig. 1. Other means for separately radiating the several waves with respectively different directivities may be used in place of that shown in Fig. 4.

Figure 5:
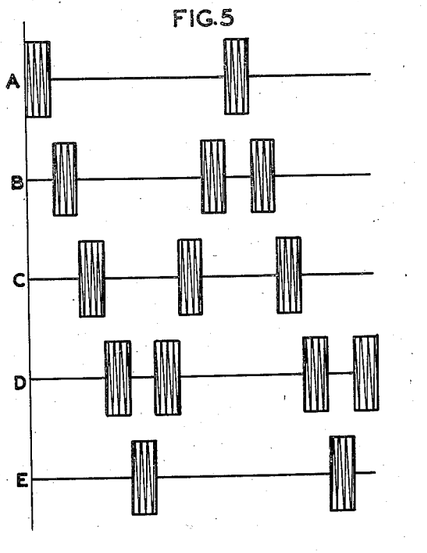
Fig. 5 shows a set of time graphs similar to Fig. 2.

As will be clear, the type of scanning thus far described is essentially unidirectional, that is, the directional beam is swept in a single direction, returning abruptly and discontinuously to its original direction at the end of each scan. If desired, the wave forms shown in Fig. 5 can be utilized, which would provide a two-directional scan. The curves A and E of Fig. 5 have pulse repetition frequencies of $f=(2n-1)T$. Curves B, C and D are formed by adding two waves of the form of curve A or E, with proper phase shift. Preferably here also, squared-cosine pulses are used in place of the square pulses shown, although the square pulses may be used where expedient.

On the other hand, if a conical type of scan is desired, the wave guides 51 to 55 may be disposed about an imaginary cylinder whose axis coincides with the focal axis of a paraboloid of revolution. In this manner the directional beam will have its major directivity axis, such as 16, sweep in a substantially conical manner which is useful for many applications.

Thus far, nothing has been said about how the waves to be radiated may be generated. Such waves may be produced by generating the envelope wave and modulating a carrier by it. This is relatively simple where square pulses are used, but is more complicated when using the more desirably squared-cosine pulses.

Figures 6, 8, 9:
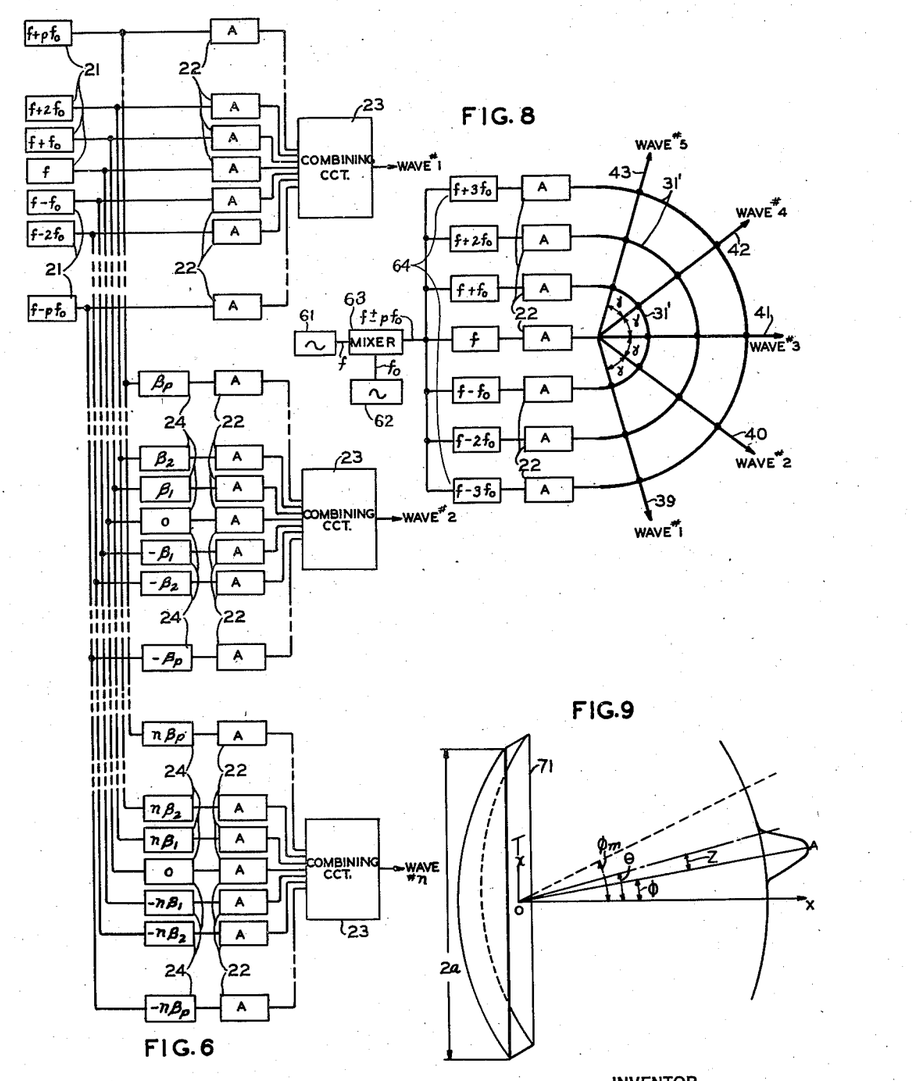
Fig. 6 shows a schematic wiring diagram of a system for producing the waves to be radiated in accordance with the characteristics of Fig. 1.
Fig. 8 shows a further schematic wiring diagram of a system similar to Figs. 6 and 7.
Fig. 9 shows a diagram useful in explaining certain principles of the present invention.

Another way to produce these radiated waves, applicable to any form of pulse, is by synthesis and is illustrated in Fig. 6.

The wave of Fig. 2A, with carrier frequency $f$, will have side band components according to the following equation:

$$f_0 T \cos 2\pi f t + \sum_{m=1}^{m=\infty} b_m \left\{ \cos [2\pi(f+mf_0)t] + \cos [2\pi(f-mf_0)t] \right\} \quad (3)$$

where $$b_m = \frac{\sin (\pi m f_0 T)}{\pi m} \quad (3')$$

The resultant wave to be radiated according to each of the radiation patterns can then be formed by synthesizing various constant frequency waves, each having a frequency corresponding to one side band frequency, and being of a constant amplitude equal to the required amplitude $b_m$ of the side band component. Thus, in Fig. 6, assuming that $p$ side band components are required in practice, $2p+1$ frequency generators 21 are utilized, each producing one of the frequencies $f \pm m f_0$, where $m$ is the order of the side band and takes any value from 0 (for the carrier component) to $p$ (for the $p$th order side band component). Each of these waves is then passed through a respective attenuator or amplifier or other amplitude adjuster, adjusted or selected to produce the amplitude value indicated by $b_m$ in Equation 3' above. All of these adjusted waves are then combined in a suitable combining circuit 23 whose output wave No. 1 will then represent the wave which, for example, is to be radiated in accordance with pattern 11.

As shown above with respect to Fig. 2B, the wave to be radiated in accordance with pattern 12 must be time-displaced with respect to the wave No. 1 by the amount $\alpha$, where $\alpha$ is a period of time equal to $$\frac{1}{nf_0}$$

where $$\frac{1}{f_0}$$

is the periodicity of the pulse wave, such as shown in Fig. 2. In order to time displace the complete modulated wave output from circuit 23 by an amount $\alpha$, it can be shown that it is necessary to phase shift the carrier component of frequency $f$ by zero, and to phase shift each side band component to order $m$ by an amount $$\beta_m = \frac{2\pi m}{n}$$

electrical degrees. Upon side band components are phase-shifted in leading sense and lower side band components are phase-shifted in the opposite sense. That is, the upper side band components of wave No. 2 are caused to lead their corresponding components of wave No. 1 in phase by amount $\beta_m$, and the lower side band components will then be caused to lag their corresponding components of wave No. 1 in phase by $\beta_m$. Such phase shifting is performed in respective phase shifters 24, whose outputs are then fed to similar amplitude adjusters 22 and are combined in a combining circuit 23 to form wave No. 2.

Similarly, the $2p+1$ waves from generators or sources 21 are supplied to other groups of phase shifters and attenuators. Each phase shifter group will produce a time shift of $\alpha$ for its combined output wave with respect to the preceding wave, and in this way all the $m$ waves of Fig. 2 (indicated as five in number in the present illustration), may be generated. These output time-shifted waves may then be radiated as in Fig. 4.

Other wave forms, such as in Fig. 3, may be generated by suitable adjustment of the attenuators or amplitude adjusters 22. Thus, for the squared-cosine pulse wave, one radiated wave will have the form of Equation 3, but with $$b_m = \frac{\sin (2\pi m f_0 T)}{2\pi m [1-(2m f_0 T)^2]} \quad (4)$$

while the others will be time-shifted versions of this wave. Therefore it is merely necessary to adjust the amplitude adjusters 22 to produce output amplitudes of $b_m$, and the system of Fig. 6 will produce the necessary squared-cosine modulated pulse waves.

Figures 7, 10:
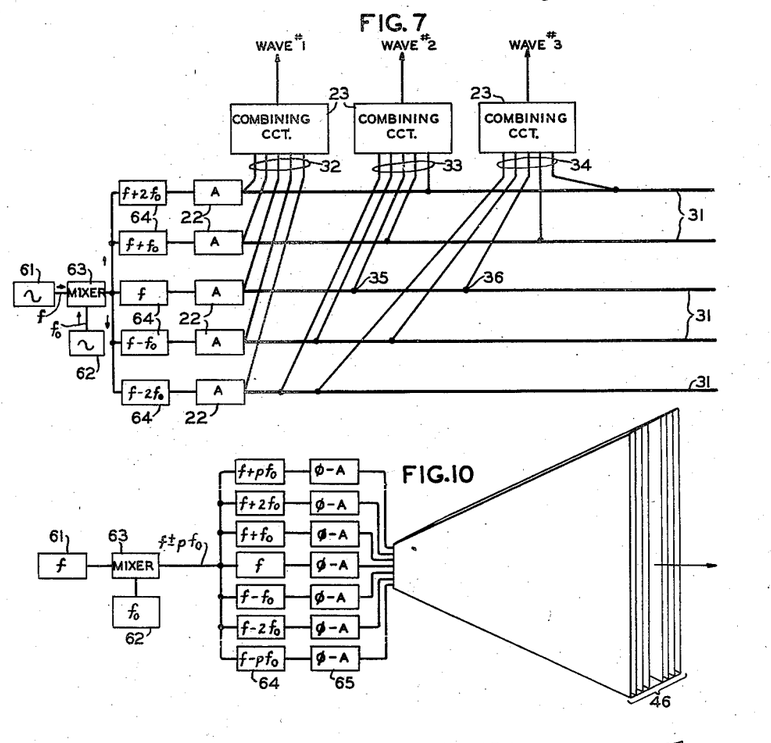
Fig. 7 shows a schematic wiring diagram of a system similar to Fig. 6.
Fig. 10 shows a schematic wiring diagram of a system operating in accordance with the principles illustrated by Fig. 9.

Fig. 7 shows a simpler arrangement similar to Fig. 6. It is to be noted that in the system of Fig. 6 the amplitude of a particular side band component of one of the combined output waves is the same as the amplitude of the same side band component of each of the other output waves; that is, the amplitude of, for example, the third order side band of wave No. 1 is the same as the amplitude of the third order side band of all the other waves, and both upper and lower side band components of the same order have equal amplitude. For this reason only one set of amplitude adjusters is really necessary, provided that any attenuation which may exist in the phase shifters is equalized. This feature is taken advantage of in the system of Fig. 7. Here the respective constant frequency waves derived from sources 21 are passed through the respective attenuators or amplitude adjusters 22 wherein their amplitudes are adjusted to the values required by the particular type of combined wave to be produced, taking into account any attenuation later produced in the circuit.

The system of Fig. 7 also utilizes simplified phase shifters which have the form of high frequency conductors such as concentric lines or wave guides. Such conductors have the property of substantially constant phase shift per unit length, which may be designed so that practicable lengths of conductor will produce the required phase shift $$\beta_m = \frac{2\pi m}{n}$$

Thus, in Fig. 7 the outputs of attenuators 22 are fed to the phase-shifting energy conductors 31 along which the energy is made to flow. The outputs of attenuators 22 are also connected directly by suitable conductors 32 designed to have substantially equal phase shifts to the combining circuit 23 whose output is then wave No. 1, in the same manner as in Fig. 6.

In order to get the time-shifted wave No. 2, its combining circuit 23 is supplied with energy from the conductors 31, through leads 33, also designed to have substantially equal phase shifts. Energy at the carrier frequency $f$ is tapped from its corresponding line 31 at a point 35, separated from the corresponding attenuator 22 by a distance adapted to give a phase shift of some multiple of 360 degrees. The other taps from conductors 31 are located at differing distances from their corresponding attenuators so that each side band of order $m$ has a phase shift of $\beta_m$ with respect to the carrier frequency wave, the upper side band components having leading phase shift, and the lower side band components having lagging phase shift.

Similarly, the combining circuit 23 producing wave No. 3 has its carrier frequency component tapped from line 31 at point 36 located to give a phase shift of a multiple of 360 degrees from point 35. The other taps from conductors 31, connected to combining circuit 23 by leads 34 having substantially equal phase shifts, are at differing distances from their attenuators, selected so that the required phase shifts of $2\beta_m$ are obtained, $m$ being again the order of the side band under consideration. In this way all the waves to be radiated may be synthesized or built up from their single frequency components.

It is to be noted that all the conductors 31 need not produce the same phase shift per unit length. For economy of space and material, those which require greatest phase shift (such as the uppermost one in Fig. 7) may be designed to produce greater phase shift per unit length, to reduce the over-all length needed.

One manner in which the various single frequencies may be produced is also shown in Fig. 7. Here, a suitable carrier frequency generator 61 producing frequency $f$ is connected to a mixer 63 preferably of the square law type to which is also supplied a wave of frequency $f_0$ from pulse generator 62. The output from mixer 63 will contain many side frequencies $f \pm p f_0$, which may be separated by suitable filters 64.

Another phase shifting arrangement similar to that of Fig. 7 is shown in Fig. 8, in which the conductors 31' corresponding to 31 of Fig. 7 are bent in the form of semi-circles. Each semicircle 31' has both ends fed by the two side band components of the same order, that is, by the upper and lower side band of a given order. Thus, the innermost semicircular conductor 31' is supplied with energy of frequency $f+f_0$ at one end and $f-f_0$ at the other end, both of these input waves being previously adjusted to the amplitude required by the particular type of pulse wave utilized, by amplitude adjusters 22. The second semi-circular conductor 31' is supplied with energy of frequency $f+2f_0$ and $f-2f_0$ at its respective ends, properly adjusted in amplitude. The remaining conductors are similarly supplied. Each semi-circle 31' is designed to give the same phase shift per unit length, and the radii of the semi-circles are chosen to be in integral multiple relationship, that is, the second semi-circle has twice the radius of the first, the third three times the first, etc. In this way the lengths and therefore the phase shifts of the several conductors 31' running between two fixed radii will vary in integral multiple relationship.

A conductor 41, having predetermined phase shift taps off energy from each of the semi-circles 31' for example, at their centers, and is connected directly to the carrier component source of frequency $f$ through the amplitude adjuster 22. The energies at the several frequencies fed to this conductor 41 may be arbitrarily considered to have zero phase. A conductor 42 having phase shift substantially equal to that of conductor 41 also taps off energy from the semi-circles along a radius making an angle $\gamma$ with that of the tap 39. It will be seen that the phase of the carrier component of frequency $f$ in conductor 42 will be the same as in conductor 41, since the carrier component is fed directly into both 41 and 42. Energy of frequency $f+f_0$ in conductor 42 will lead that in conductor 41 by the phase shift corresponding to an angle $\gamma$ of the first semi-circular conductor 31', which is designed or selected to have the value $$\frac{2\pi}{n}$$

The phase shift of the energy at frequency $f+2f_0$ will then be $$2\left(\frac{2\pi}{n}\right)$$

since the length of arc of the second conductor 31' is twice that in the first conductor 31'. Correspondingly the phase shift at frequency $f-f_0$ will be a lagging phase shift of the amount $$\frac{2\pi}{n}$$

etc. Other radial conductors 39, 40, 43 similar to 41, 42 and having phase shifts equal thereto are angularly spaced at the angle γ and provide the other waves to be radiated. By this arrangement every side band component of the wave to be synthesized will have its proper phase shift. If desired, separate amplifying or buffer stages may be inserted between the respective taps of each conductor 39 to 43, in order to compensate for any stray difference in phase shift which may occur, and to provide the proper resultant relationships. The combined output waves are derived directly in conductors 39 to 43, and may be supplied for example, to the radiating arrangement of Fig. 4.

Each of the arrangements discussed above has been described with respect to a radiating scanner. However, they are readily adapted to operate as receiving scanners. Thus, for a receiving scanner, energy received by an antenna similar to that shown in Fig. 4 will be transmitted by guides 51 to 55 to a receiver apparatus. The transmission down these guides 51 to 54 is then blocked, in any well-known manner, such as by blocking amplifiers, except at the times and to the extent indicated by the respective pulse waves of Fig. 2 or Fig. 3.

If signal intelligence is transmitted, the blocking may be done after independent detection of the several waves in guides 51 to 55.

The system shown in Fig. 6 may be used as a receiver scanner by replacing the generators 21 by corresponding sharply tuned pass filters, and connecting the outputs of these filters to a suitable combining circuit to which the receiver is connected. In such case, the phase shifters 24, circuits 23, and adjusters 22 should be bilateral in character, or reversed in connection, to permit transmission from antenna to receivers.

In Figs. 7 and 8, receiving scanning may be obtained by replacing mixer 63 by a receiver circuit.

In each case, the receiving scanners of Figs. 6, 7 and 8 will have the same amplitude adjustments and phase shifts as discussed for the corresponding radiating scanners.

In place of separately synthesizing each of the separate waves to be radiated in respectively different directions in the manner discussed above, the present invention may be further simplified while still producing the scanning without the use of moving parts. This is done by separately radiating each fixed frequency side band component with its own directivity characteristic rather than combining the side bands into several different waves which are then separately directively radiated in different directions.

Thus, referring to Fig. 9, there is shown a schematic diagram which will be useful in explaining the operation of this aspect of the present invention. In this figure there is shown a directional antenna of suitable type which, for example, may include a suitably energized parabolic reflector 71. The directivity of this antenna is to be determined to produce the desired scanning.

First the directivity characteristic to be scanned is chosen. This characteristic is the peak radiation field intensity $E_M$ as a function of angular deviation $z$ from a direction OA of maximum radiation, and is expressed as $E_M(z)$. If the axis OA is at an angle $\phi$ from the focal axis OX of radiator 51, then $z = \theta - \phi$, where $\theta$ is the angle from OX to the direction making an angle $z$ with respect to OA, at which angle $\theta$ there is the field intensity $E_M$. The desired field space pattern is thus expressed by $E_M(\theta - \phi)$.

To make this pattern scan without altering its shape, it is merely necessary to vary $\phi$. Thus, if $\phi_M$ is the maximum deviation of OA from OX, and if $F(t)$ represents the desired variation of the angular position of OA as a function of time $t$, then $\phi = \phi_M F(t)$, and $$E = E_M(\theta - \phi_M F[t]) e^{2\pi i f t} \quad (5)$$

where the last factor denotes the alternating character of the field intensity E at the frequency $f$, and $E_M$ indicates the maximum amplitude of E during each cycle of frequency $f$, which value $E_M$ varies with angular deviation $\theta$ from OX in accordance with the function $$E_M(\theta - \phi_M F[t])$$

In accordance with established convention, $i$ is the pure imaginary $\sqrt{-1}$ and $e$ is the base of natural logarithmic system.

The field intensity $E'(x,t)$ across the mouth of radiator 51, as a function of the distance $x$ from origin O and of time $t$ is given by the Fourier transform of (5) and is proportional to $$\int E_M(\theta - \phi_M F[t]) e^{2\pi i f t} e^{2\pi i x \theta / c} d\theta \quad (6)$$

for $\theta$ small compared to one radian, where $f$ is the radiation frequency and $c$ is the velocity of light, so that $$\frac{c}{f} = \lambda \text{ (wavelength)}$$

Expressing this distance in terms of wavelengths by the relation $$X = \frac{x}{\lambda}$$

and letting $z = \theta - \phi_M F(t)$ so that $d\theta = dz$, this may be written $$E'(x, t) e^{2\pi i f t} e^{2\pi i X \phi_M F(t)} \int_{-\infty}^{+\infty} E_M(z) e^{2\pi i X z} dz \quad (7)$$

In this expression, the first factor of the right member represents the alternating character of the field E', and may be considered a carrier component. The second factor is of the nature of a modulation upon, or time variation in amplitude of, this carrier, while the third factor (the integral) is the Fourier transform of the space pattern and represents the space distribution of the field intensity across the mouth of the antenna.

We may write $$S = e^{2\pi i f t} e^{2\pi i \phi_M F(t) X} \quad (8)$$

Then, for the special case of sinusoidal scanning at frequency $f_0$, where $$F(t) = \sin(2\pi f_0 t)$$

$$S = e^{2\pi i f t} \sum_{-\infty}^{+\infty} \left\{ J_{2m}(r) \cos[2m(2\pi f_0 t)] + \right.$$

$$\left. i J_{2m+1}(r) \sin[(2m+1)(2\pi f_0 t)] \right\} \quad (9)$$

where $i = \sqrt{-1}$ and $J_p(r)$ is the Bessel function of first kind and order $p$ with argument $r = 2\pi X \phi_M$.

This may be expanded into:

$$2S = \sum_{m=-\infty}^{m=+\infty} \left\{ J_{2m}(r) [\cos 2\pi(f + 2mf_0)t + \right.$$

$$\cos 2\pi(f - 2mf_0)t] + J_{2m+1}(r)[\cos 2\pi(f + 2mf_0 + f_0)t +$$

$$\cos 2\pi(f - 2mf_0 - f_0)t] + i J_{2m}(r)[\sin 2\pi(f + 2mf_0)t +$$

$$\sin 2\pi(f - 2mf_0)t] + i J_{2m+1}(r)[\sin 2\pi(f + 2mf_0 + f_0)t -$$

$$\left. \sin 2\pi(f - 2mf_0 - f_0)t] \right\} \quad (10)$$

This expression shows that a plurality of discrete frequencies is here involved, these frequencies being separated by a frequency difference of $f_0$ and in effect representing side band components. Each of these side band frequencies of frequency $f+mf_0$ has its own amplitude distribution of electric field intensity $\overline{E}'_m$ across the face of the radiator, as given by $$\overline{E}'_m = J_m(2\pi X\phi_M) \int_{-\infty}^{+\infty} \overline{E}_M(z) e^{2\pi i X z} dz \quad (11)$$

The phase of each of these components is determined by the real and imaginary components of the corresponding terms of (10).

According to the present invention the desired scanning of the resultant directivity pattern $E(z)$ is produced by separately generating each of these side band frequency components, and then radiating each of these components independently, with its own directivity characteristic, such that the combined radiation at a distance from the radiator will produce the same effect as a rapidly scanned, highly directive beam. In this system, all the directivity characteristics cover the same portion of space, but with independent amplitudes in any given direction.

As a practical form of radiator, according to this aspect of the invention, a plurality of very narrow reflectors or electromagnetic horns may be utilized, as shown in Fig. 10, each radiating a single side frequency. Each of these radiators is adjusted or selected in accordance with the considerations given below so as to provide the desired directivity characteristic corresponding to the particular side band component which the radiator radiates. The various side frequencies may be generated, as shown in the same manner as in Fig. 7. The phases and amplitudes of these various side frequencies may be adjusted to the values required, in accordance with the considerations set forth above, by use of amplitude and phase adjusters 45.

Frequency components will be practically important for values of $m$ up to approximately $2\pi X_M \phi_M$. The maximum value $X_M$ of $X$ will occur at the edge of the radiator, or for $$X = \frac{a}{\lambda} = X_M$$

where $2a$ is the total radiator aperture, as shown in Fig. 9. Then $$X_M \doteq \frac{2}{3\psi}$$

where $\psi$ is the angular beam width between half power points. The number of side frequencies is determined by the largest value $q$ of $m$ necessary, which will thus be given by $$q \doteq 2\pi X\phi_M \doteq \frac{4\pi \phi_M}{3\psi} \quad (12)$$

The total frequency band width is of course given by $2qf_0$. If the beam is to be swung rapidly, $f_0$ is large, giving large band width. If the sweep angle $2\phi_M$ is much larger than the pattern width $\psi$, $q$ is large, also giving large band width.

The manner in which a suitable scanner may be designed will now be indicated. The first information to be determined is the character or shape of the radiation pattern desired, that is, the particular variation of electric field intensity at a large distance from the radiator as a function of angular orientation with respect to the radiator. In the following two illustrations it will be assumed that $$E_M(z) = E^{-.868z^2} \quad (13)$$

This yields a radiation pattern having an angular width between the half-power points of .04 radian or slightly over two degrees, which is a practical value. This radiation pattern is plotted in Fig. 11, the amplitude of $E_M$ along the axis of greatest directivity, for which $z=0$, being arbitrarily chosen as unity.

Figure 12:
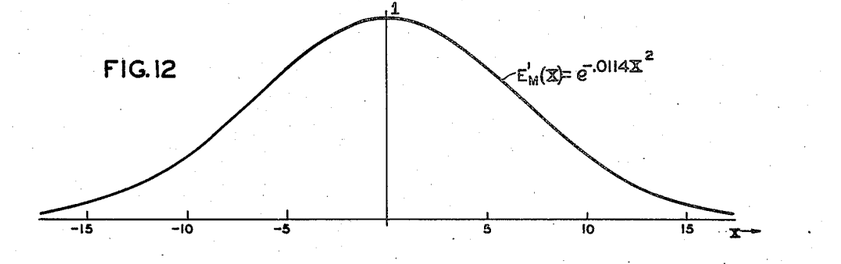
Fig. 12 shows a curve of electric intensity as a function of position in the mouth of a radiator corresponding to the characteristic of Fig. 11.

Assuming firstly a fairly small beam swing $2\phi_M$ equal to one-half the pattern width or .02 radian, the variation of the peak electric field intensity $E'_M$ across the aperture of the radiator, which is essentially the Fourier transform of the space pattern, will be shown in Fig. 12, plotted against $X$, which is the distance from the focal axis $OX$ in terms of wavelengths. It is expressed as $$E'_M = E^{-.0114X^2} \quad (14)$$

It will be noted from Fig. 12 that, in the illustration used, $E'_M$ is appreciable out to about 15 wavelengths from the focal axis, so that the radiator aperture should preferably be 30 wavelengths or larger. At microwave wavelengths, such as of the order of ten centimeters or less, this produces a fairly practicable size for the radiator.

For the value of $2\phi_M$ selected above, $q \doteq 1$ so that only three frequency components need be considered, those for $m=+1$, $m=0$, and $m=-1$, which correspond to the carrier frequency $f$, the upper side band $f+f_0$ and the lower side band $f-f_0$. The amplitude of each of these components is given by the quantity $J_m(2\pi X\phi_M)$, where, for the carrier component $m$ takes on the value zero while for the first side band (either upper or lower) $m$ takes on the value 1. (Since $J_{-m}=J_{+m}$).

Figures 13, 14:
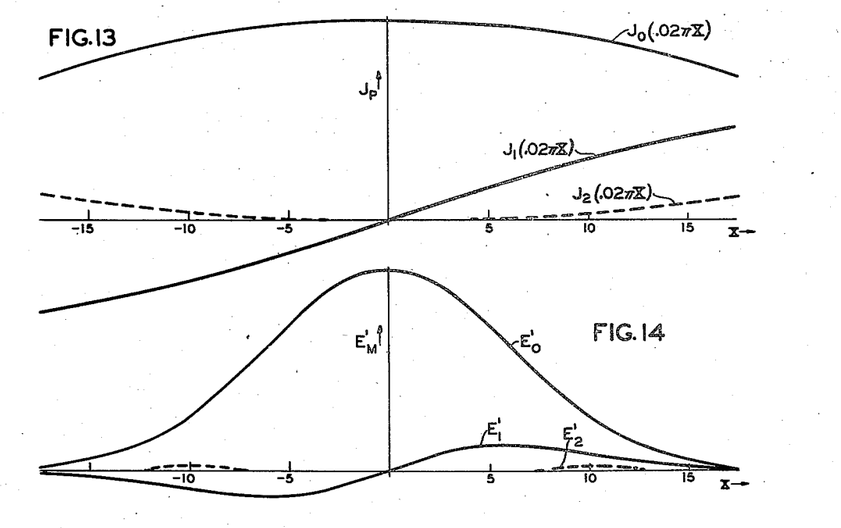
Fig. 13 shows curves of the amplitude of various Bessel functions plotted against position in the mouth of the radiator.
Fig. 14 shows curves of the amplitude of the several components of waves to be radiated, plotted against position in the mouth of the radiator.

Fig. 13 shows the graphs of $J_0$, $J_1$ and $J_2$ as functions of $X$ for the value of $\phi_M$ assumed in this illustration. The product of the curve of Fig. 12 by each of the curves of Fig. 13 gives the electric field intensity $E'_M$ required across the face of the radiator, for the respective frequency components and these are plotted in Fig. 14. The curve labeled $E'_0$ is the amplitude characteristic for the component of carrier frequency $f$, while $E'_1$ is that for $f+f_0$ or $f-f_0$. It will be seen that the amplitude of the second order side band component shown by curve $E'_2$ is extremely negligible, in agreement with the analysis determining $q_M$, and that the amplitude of the first order side band amounts only to approximately 15 percent of the carrier amplitude.

The type of radiator which will produce the characteristic of curve $E'_0$ of Fig. 14 may be determined empirically or experimentally, for example, by starting with a thin parabolic cylindrical reflector and distorting the parabolic wall thereof. However, an actual parabola will serve as a suitable approximation in many instances.

Figure 15:
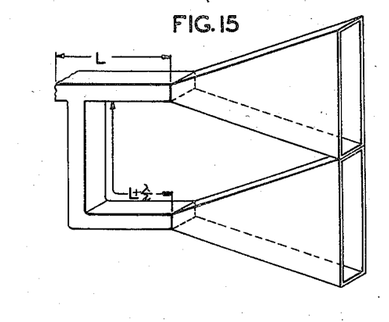
Figs. 15, 15A and 16 are diagrammatic representations of antennas suitable for producing some of the necessary characteristics of the invention.

It will be noted that the curve $E'_1$ has positive polarity for one-half and negative polarity for the other half. This indicates that the electric field intensity should be of opposite phase, or 180 degrees phase difference, in the two halves. Such a wave may be radiated by the use of two separate radiators, each having half the aperture of the major radiator and excited in phase opposition. As shown in Fig. 15, two electromagnetic horns may be used. If desired, a single horn with a center septum 72 and with its two halves independently excited in phase opposition may be used as shown in Fig. 15A.

Figure 15A:
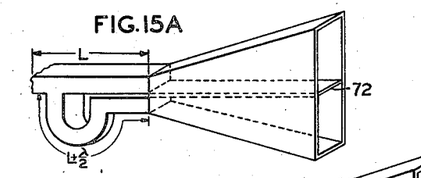

If desired, suitably excited reflectors could be used in place of the horns of Figs. 15 and 15A, these reflectors being shaped and/or excited to produce the same radiation.

Figure 16:
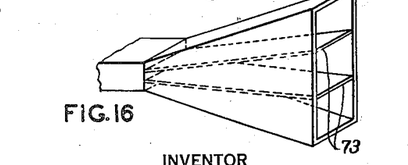

Alternatively, as shown in Fig. 16, a single electro-magnetic horn may be utilized which carries vanes 73 dividing it into sectors. By adjusting the relative spacings of the sectors at the input and output end of the horn various amplitude distributions can be obtained, as required.

In this way, by synthesizing single frequency waves, each with its proper space pattern, the required scanning is obtained.

As a second illustration, let it be assumed that the same space pattern $E(z)$ is required to be scanned, but with a beam swing of twice the beam width or .08 radian in the example chosen. In this instance, $q$ is approximately 4, so that all components up to the fourth order side band will be required, namely, nine frequency components in all:

$$f, f \pm f_0, f \pm 2f_0, f \pm 3f_0, \text{ and } f \pm 4f_0$$

Figure 11:
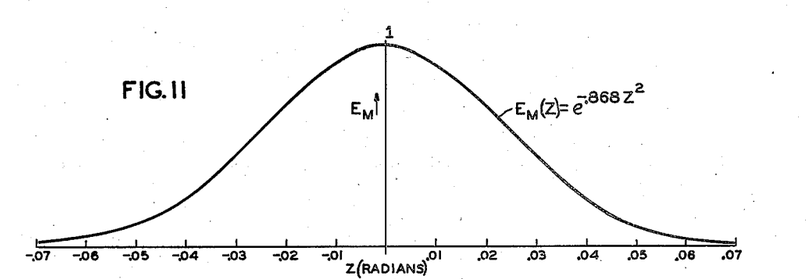
Fig. 11 is a graph of a desired directivity characteristic showing the peak electric intensity as a function of angular deviation from the axis of maximum intensity.
Figure 17:
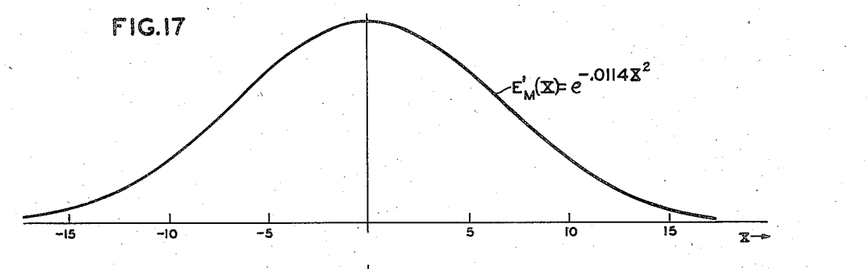
Figs. 17 to 19 are curves similar to Figs. 12 to 14 relating to a different required directivity characteristic.
Figure 18:
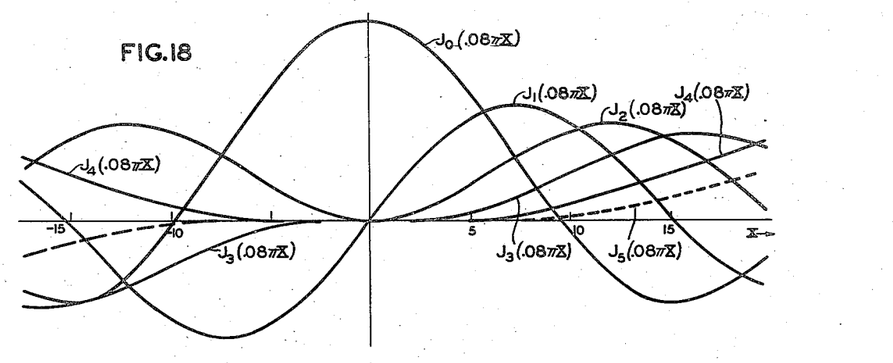
Figure 19:
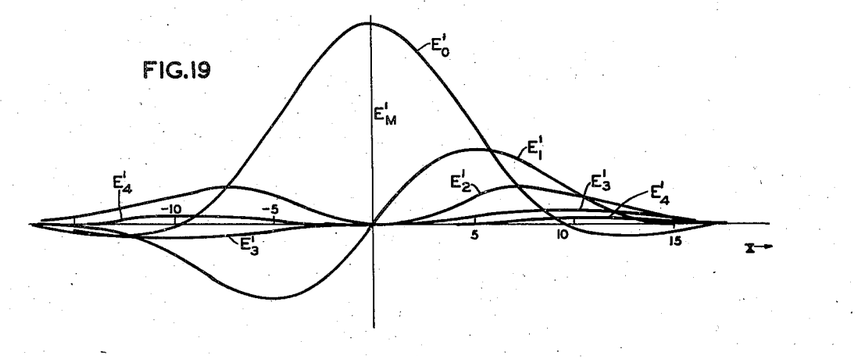

Fig. 17 shows the transform of the space pattern of Fig. 11 for this condition. Fig. 18 shows the corresponding Bessel functions for the first eleven frequency components, corresponding to Bessel functions up to the fifth order, it being noted that the same function applies for corresponding upper and lower side band components. It will also be noted that Fig. 18 is essentially the same as Fig. 13, but with compressed abscissa scale. The products of the curves of Fig. 18 by Fig. 17 gives the space distribution of the amplitude of the electric field intensity across the aperture of the radiator for each of the various side band components as shown in Fig. 19. It will be seen that the fourth order component $E'_4$ is only substantially three percent of the carrier component $E'_0$ and can be practically neglected. The third order component $E'_3$ which is about only seven percent that of the carrier may also be neglected for a rougher approximation. In this instance it will be noted that the carrier component $E'_0$ also has phase reversals in the sections separated from the axis by more than approximately ten wavelengths. These phase reversals, as indicated above, can be obtained by separate horns or antennas, or by suitably designed sectoral horns. As in the first illustration, upper and lower side band components of the same order have the same amplitude distributions.

These two illustrations should serve to indicate the general method of analysis utilized in practicing the present invention. By this invention a rapidly scanned, inertialess directivity characteristic is provided, in which single frequency waves are radiated with particular space distribution patterns so that at points in space removed from the radiator all of the frequencies combine to form what is essentially a rapidly scanned, highly directive radiation pattern.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. The method of scanning a directional radiant energy beam comprising the steps of producing a sequence of time-displaced, pulsed high frequency electromagnetic waves, and radiating said waves with respectively different directivity characteristics, said characteristics having diverging axes of maximum directivity and having partially overlapping directivity patterns.

2. The method as in claim 1 wherein said waves comprise repetitive periodic pulses of high frequency energy, each of said pulses having a rounded envelope.

3. The method as in claim 1 wherein each of said waves comprises a periodic sequence of pulses of high frequency electromagnetic energy, each of said pulses having an envelope of the shape of a cosine-squared wave, and the pulses of successive time-displaced waves being time displaced by an amount substantially equal to half the total pulse duration, whereby said successive wave pulses are partially concurrent.

4. The method of scanning a highly directional high frequency electromagnetic wave comprising the steps of producing a plurality of equally spaced single frequency waves, adjusting the amplitude of each of said waves to correspond to the amplitude of a side band frequency component of a pulsed high frequency electromagnetic wave, combining said amplitude adjusted waves to produce a first combined wave, phase shifting said adjusted waves by equal amounts corresponding to the frequency of said waves to form further combined waves, the phase shifts for each frequency of said further combined waves being integrally related, and radiating each of said combined waves with a respective directivity characteristic, said directivity characteristics having diverging axes of maximum directivity and being partially overlapping.

5. The method of scanning a directional radiant energy receptivity pattern comprising receiving said energy simultaneously with a plurality of different receptivity characteristics having differing axes of maximum receptivity, and selectively and successively transferring said received energy to a utilization circuit, the periods of said transference being partially concurrent for successively transferred energies.

6. The method of scanning a directional radiant energy beam comprising the steps of producing a plurality of single frequency waves, each successive pair of waves having equal frequency difference, and independently radiating each of said waves into a common predetermined portion of space, and with an individual directivity characteristic, said characteristic being determined by the corresponding Fourier component of the Fourier transform of the desired scanned pattern at distances remote from said radiator.

7. The method of scanning a directional electromagnetic energy beam comprising the steps of producing a plurality of single frequency waves, and independently radiating each of said waves into the same predetermined portion of space with an individual directivity characteristic chosen to provide a combined electromagnetic field at points distant from said radiation of a character equivalent to scanning of a directional beam.

8. High frequency radiant energy scanning apparatus comprising means for producing a sequence of time-displaced pulsed high frequency electromagnetic waves, a corresponding plurality of antennae means having respectively different directivity characteristics with diverging axes of maximum directivity and partially overlapping directivity patterns, and means for exciting each of said antenna by a corresponding one of said waves.

9. High frequency scanning apparatus comprising means for producing a plurality of high frequency waves, each having a periodic sequence of pulses of high frequency electromagnetic energy, each of said pulses having a rounded envelope and the pulses of successive time-displaced waves being time-displaced by an amount substantially equal to half the total pulse duration, whereby said successive wave pulses are partially concurrent, a corresponding plurality of directional antennae having diverging axes of maximum directivity and partially overlapping directivity patterns, and means for exciting each of said antennae by a corresponding one of said waves.

10. High frequency apparatus comprising a plurality of directional antennae having respectively diverging and overlapping directivity characteristics, means for producing a corresponding plurality of pulsed, time-displaced high frequency waves and means for exciting said antennae respectively by said waves.

11. Apparatus as in claim 10 wherein said pulsed waves are partially concurrent.

12. Apparatus as in claim 10 wherein the envelope of said pulsed waves has a rounded form and is partially concurrent.

13. High frequency apparatus comprising a plurality of circuits adapted each to operate at a single frequency, said plurality of frequencies being equally separated, a plurality of phase shifters connected to each of said circuits in cascade, the phase shifters connected to any one circuit having equal phase shifts at the corresponding frequency of said one circuit, the phase shifters connected to different frequency circuits having phase shifts linearly related to the frequency of the respective coupled circuits.

14. High frequency scanner apparatus comprising a plurality of circuits each adapted to operate at a single frequency, said single frequencies being equally separated, a plurality of directional antennae having diverging axes of maximum directivity and partially overlapping directivity characteristics, and means coupling each of said antennae with all of said circuits, each said coupling means comprising a set of phase shifters coupled respectively to said circuits and producing respective phase shifts linearly related to the respective frequencies of said circuits coupled thereto, the phase shifters of the respective sets coupled to the same circuit having integrally related phase shifts.

15. High frequency scanner apparatus comprising a plurality of circuits each adapted to operate at a single frequency, said single frequencies being equally separated, a plurality of directional antennae having diverging axes of maximum directivity and partially overlapping directivity characteristics, and means for coupling each said antennae with all said circuits with respective phase shifts linearly related to the frequency of said circuits, the resulting sets of phase shifts for said antennae being proportional.

16. High frequency apparatus for producing a plurality of time-displaced modulated high frequency waves, comprising a plurality of sources of high frequency wave having equally separated frequencies, said source being arranged in pairs equally separated in frequency above and below the frequency of a predetermined source, a plurality of phase-shifting conductors having equal phase shift per unit length and arranged in concentric semi-circles with radii proportional to successive integers, means connecting each pair of said sources to the ends of a respective semi-circular conductor, and a plurality of output conductor means coupled to radially disposed points of said semi-circular conductors, whereby the combined waves supplied to said output conductor means are similarly-modulated but time-displaced waves the time-displacement between any two waves being proportional to the angle between the radial arrangements of coupling points for said two waves.

17. High frequency scanning apparatus comprising means for producing a plurality of equally spaced single frequency waves, means for adjusting the amplitude of each of said waves to correspond to the amplitude of a side band frequency component of a pulsed high frequency electromagnetic wave, means for combining said amplitude-adjusted waves to produce a first combined wave, means for producing further waves which are successively time-displaced versions of said first combined wave, a plurality of directional antennae having diverging axes of maximum directivity and with partially overlapping directivity patterns, and means for exciting each of said antennae by a corresponding one of said combined and time-displaced waves.

18. High frequency scanning apparatus for scanning a predetermined space radiation pattern over a predetermined angular swing, comprising a plurality of sources of single high frequency waves having equal frequency difference, and a corresponding plurality of apertured directive antennae coupled respectively to said sources and having respectively different substantially overlapping directivity characteristics, each of said antennae having an electric field intensity varying across the aperture thereof as a function of distance from the center of said aperture, in accordance with the product of the Fourier transform of said predetermined pattern times a Bessel function of argument proportional to said distance and to said angular swing and of order equal to the value of the frequency separation of the frequency of the source corresponding to said each antennae from the middle frequency of said sources divided by said frequency difference.

19. High frequency scanning apparatus comprising means for producing a plurality of equally separated single frequency waves, a corresponding plurality of directional antennae having substantially overlapping and different directivity characteristics, and means for exciting each of said antennae by a respective one of said waves, said directivity characteristics being chosen to provide a combined electromagnetic field at points distant from said antennae of a character equivalent to scanning of a directional radiant energy beam.

20. Apparatus as in claim 19 wherein each of said directivity characteristics corresponds to a Fourier component of the Fourier transform of a desired directivity pattern to be scanned.

21. High frequency scanning apparatus for scanning a predetermined space radiation pattern, comprising a plurality of sources of single high frequency waves having equal frequency difference, and a corresponding plurality of apertured directional antennae coupled respectively to said sources and having respectively different substantially overlapping directivity characteristics, each of said antennae having an electric field intensity varying across the aperture thereof in accordance with the Fourier transform of said predetermined pattern.

22. High frequency scanning apparatus for scanning a predetermined space radiation pattern over a predetermined angular swing, comprising a plurality of sources of single high frequency waves having equal frequency difference, and a corresponding plurality of apertured directive antennae coupled respectively to said sources and having respectively different substantially overlapping directivity characteristics, each of said antenna having an electric field intensity varying across the aperture thereof as a function of distance from the center of said aperture in accordance with a Bessel function of argument proportional to said distance and to said angular swing.

GERELD LEON TAWNEY.

Certificate of Correction

March 9, 1948.

Patent No. 2,437,281.

GERELD LEON TAWNEY

It is hereby certified that error appears in the printed specification of the above numbered patent requiring correction as follows: Column 6, line 43, for the word "upon" read *upper*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*

Disclaimer 2,437,281.—*Gereld Leon Tawney*, Hempstead, N. Y. HIGH FREQUENCY RADIANT ENERGY APPARATUS. Patent dated Mar. 9, 1948. Disclaimer filed Sept. 14, 1949, by the assignee, *The Sperry Corporation*.

Hereby enters this disclaimer to claim 1 of said patent.

[*Official Gazette October 25, 1949.*]